Jan. 23, 1951  C. E. ERICKSON ET AL  2,538,935
METHOD FOR FORMING PARTLY COLORED GLASS ARTICLES
Filed Oct. 8, 1945

INVENTORS
Carl E. Erickson.
Stephan E. Erickson.
BY Corbett, Mahoney & Miller
ATTORNEYS Patented Jan. 23, 1951

2,538,935

UNITED STATES PATENT OFFICE 2,538,935

METHOD FOR FORMING PARTLY COLORED GLASS ARTICLES

Carl E. Erickson and Stephan E. Erickson, Bremen, Ohio

Application October 8, 1945, Serial No. 620,992

1 Claim. (Cl. 49—79)

Our invention relates to a method for forming partly colored glass articles. It has to do, more particularly with glass articles wherein it is desired to color one portion of the article irregularly while leaving the remainder of it in crystal glass.

In the past there have been various attempts to make multicolored articles of glass but they have been quite generally unsatisfactory due to the regularity of the color which is imposed on the article. One prior art procedure for obtaining varied colored glass ware consists in spraying coloring material onto the article after it has been formed. Another way of obtaining different colors is to vary the thickness of the glass article and thus take advantage of the thick and thin walls to vary the color. Iridescent articles of glassware have also been made but have the disadvantage of chipping and losing their color after continued use. Another disadvantage of prior art articles having both colored and crystal glass is that crystal and colored glass do not weather uniformly.

One of the objects of our invention is to form a glass article having a colored portion and a crystal portion both of which are so united together as to form one integral piece.

Another object of our invention is to provide a method for forming a multicolored glass article which can be controlled during the forming operations so that innumerable shapes and contours of the colored portion can be made.

Another object of our invention is to provide a method for forming a blown piece of glassware having part of its body portion formed of crystal glass and the other part of its body portion formed of colored glass.

Another object of our invention is to form a glass article of varying colors and shapes which will vary the reflectivity of light and thus enhance the beauty of the article.

Another object of our invention is to form a multicolored glass article in which the colored portion of the article is enclosed between a plurality of layers of crystal glass.

Other objects and advantages will be apparent from the following detailed description and the accompanying drawings wherein similar characters of reference designate corresponding parts and wherein.

Figure 1:
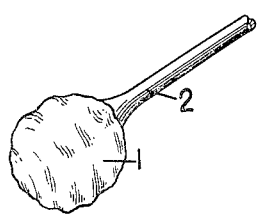
Figure 1 is a fragmentary elevational view of a blow pipe showing a gather of glass, thereon.

In the carrying out of our method, a gather of glass 1 is taken from the furnace on a blow pipe 2 by the gathering boy, as shown in Figure 1.

Figure 2:
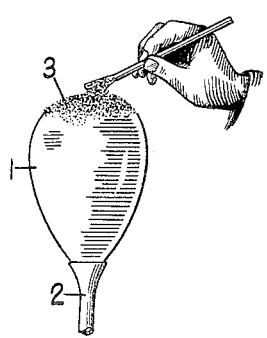
Figure 2 is a fragmentary elevational view of a blow pipe with a gather of glass thereon after the glass has been marvered and a puff of air has been introduced, and after a small amount of colored glass has been added to a portion of the gather.
Figure 3:
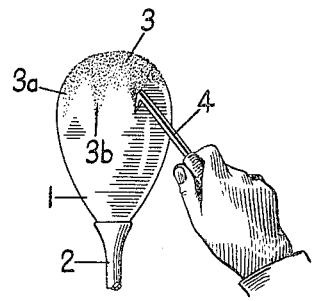
Figure 3 is a fragmentary elevational view of a blow pipe with a gather of glass thereon and showing the method of pulling the colored glass down and around a portion of the gather by means of a hand tool.

The gather 1 is marvered or blocked in the conventional manner and therefore we have not shown this operation. After the gather 1 is marvered it is given a slight "puff" of air to enlarge it as shown in Figure 2. At this point we introduce a small amount or gob of colored glass at the upper portion of the gather which can now be referred to as a blank. The colored glass is then pulled down along the sides of the blank by means of a hooked hand tool 4 thus forming streamers 3a as shown in Figure 3. The colored glass streamers will thin out to varying lengths along the sides of the blank as at points 3b shown in Figure 3. The heated soft colored glass can be shaped to any desired nonuniform streamer by varying the thickness of the color.

Figure 4:
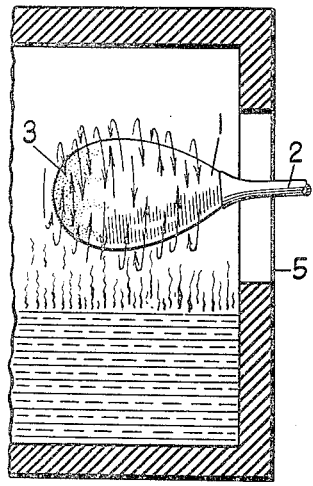
Figure 4 is a fragmentary elevational view of a blow pipe with a glass gather thereon being reheated in a furnace or glory hole to fuse the colored glass thereto.
Figure 5:
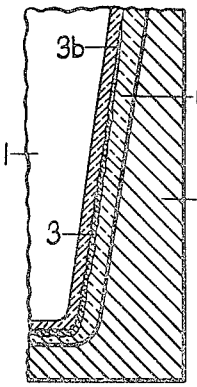
Figure 5 shows a hollow blank of glass supported on a blow pipe with the colored glass fused to the blank.
Figure 6:
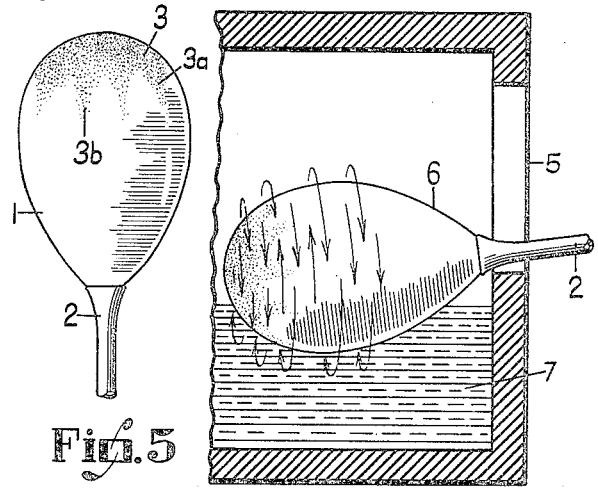
Figure 6 shows a side elevational view of a glass furnace with the blow pipe and hollow glass blank being inserted and rotated therein to gather a thin sheet of glass around the blank and coloring.
Figure 7:
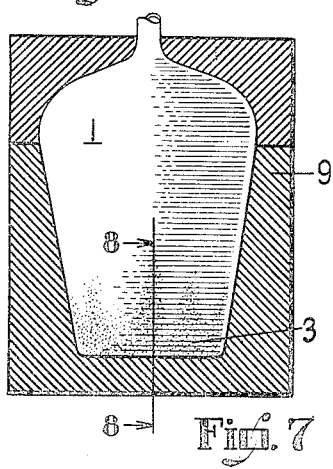
Figure 7 is a sectional view of a partible mold into which the blank shown in the preceding figures is inserted for blowing to the shape of the finished article.

The next operation of our method, is to place the blank 1 within the furnace so as to fuse the colored glass 3 to the glass blank 1. The glass blank 1 is held within the furnace 5 by means of the blow pipe 2 and rotated in the manner shown in Figure 4. This softens the glass blank 1 as well as the colored glass 3 which tends to fuse them together. The blank 1 is then removed from the furnace 5 and given another slight puff of air which enlarges the interior of the blank to obtain a proper length and shape as shown in Figure 5. It will be noted that this additional blowing operation also lengthens, thins and distorts the shape of the colored glass which is very essential to produce the finished article. The glass blank is then allowed to cool for a short period of time and is then reinserted into the furnace by means of the blow pipe 2 as shown in Figure 6. At this time, however, the blank 1 is dipped into the molten glass 7 of the furnace and is rotated again to gather another layer of glass 6 on the blank which completely covers the same and encloses the colored glass 3 between the glass blank 1 and 6. After the step shown in Figure 6 is completed the blank is then placed in the partible mold 9 and blown to its final shape. While we show the blank being finally formed in a mold, it is understood that it can be shaped by hand as well as molded. The article can also be partly blown in the mold and finished by hand. Here again the colored glass 3 has a tendency to spread out and simulates a flame or any varied shaped design at the bottom of the article.

Figures 8, 9:
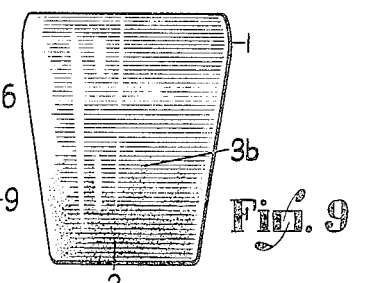
Figure 8 is a fragmentary sectional view of the glass article taken on line 8—8 of Figure 7 illustrating the coloring covered by a thin coating of glass.
Figure 9 shows the finished article with the varying colored glass portions upon the crystal portion of the article.

With reference to Figure 8 of the drawings it will be seen that the cross section shows the thickness of the layers of glass 1 and coating 6 and intermediate thereof the layer of thin varying colored glass 3. The section shown in Figure 8 is somewhat enlarged to show the relationship of the glass with the coloring therebetween. It will be understood that the colored layer 3 can be made at varying thickness depending upon the desired design of the article. Figure 8 brings out the feature of the thickness of the layers of glass. It will be evident that the outside layer 6 is heavier than the initial gather of glass 1.

Figure 9 of the drawings shows the final blown article which has been cracked off and shaped by the conventional means. This figure shows the varying color design of the final article, as being crystal or plain glass in the upper part thereof and the colored portion at the bottom of the article. The colored portions in this particular article being designed to vary the lower portion to dark and light tints and reflections. This gives the article a very unique appearance due to the deep and light color hues.

It will be obvious that we provide a method for making partly colored glassware which is distinct and novel over methods previously used. In our method we obtain control of applying coloring thereto, and means for protecting permanently the coloring fused to the glass. Enveloping the colored glass between two layers of crystal glass we obtain unique light reflectivities which greatly enhance the beauty of the ware. Another great advantage of our invention is that in placing the colored glass between two layers of crystal glass we get a uniform weathering of the article. The colored glass being between the two layers of crystal is completely protected against weathering and the crystal will weather uniformly.

It will be understood that variations of the above method can be made which will still fall within the scope of our invention. The shape and design of the colored portion of the article can be varied and it is possible that instead of clear and colored glass being used to form the article two different colored glasses may be combined and still be within the spirit of this disclosure. Another variation might be in the use of a plurality of various colored glasses along with clear or crystal colored glass in one article. We do not intend that our method should be limited to the preferred form described herein.

Various other objects and advantages will be apparent from the above description, the drawings and the following claim.

Having thus described our invention, what we claim is:

The method of producing partly colored ware which comprises gathering glass upon a blow pipe, marvering the gather, introducing air into the gather to form a hollow glass blank and adding a small gob of colored glass to the top of the blank and pulling the said colored glass into the desired position on the blank, fusing the colored glass to the blank by reheating and then permitting the fused blank to cool, dipping the blank into the glass furnace to form an outer layer of glass on the blank and then blowing to final shape.

CARL E. ERICKSON.
STEPHAN E. ERICKSON.

REFERENCES CITED

The following references are of record in the file of this patent:

UNITED STATES PATENTS

| Number | Name | Date |
|---|---|---|
| 344,415 | Shirley | June 29, 1886 |
| 389,595 | Reder | Sept. 18, 1888 |
| 952,908 | Kaye | Mar. 22, 1910 |
| 1,816,045 | Haley | July 28, 1931 |

FOREIGN PATENTS

| Number | Country | Date |
|---|---|---|
| 2,094 | Great Britain | 1891 |
| 3,355 | Great Britain | 1902 |